United States Patent
Grimm et al.

(10) Patent No.: US 11,265,995 B2
(45) Date of Patent: Mar. 1, 2022

(54) METHOD FOR OPERATING A LIGHTING DEVICE IN A MOTOR VEHICLE

(71) Applicant: Bayerische Motoren Werke Aktiengesellschaft, Munich (DE)

(72) Inventors: Stev Grimm, Munich (DE); Katrin Wildenhof, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 2 days.

(21) Appl. No.: 17/054,593

(22) PCT Filed: Jul. 2, 2019

(86) PCT No.: PCT/EP2019/067654
§ 371 (c)(1),
(2) Date: Nov. 11, 2020

(87) PCT Pub. No.: WO2020/015997
PCT Pub. Date: Jan. 23, 2020

(65) Prior Publication Data
US 2021/0185788 A1 Jun. 17, 2021

(30) Foreign Application Priority Data
Jul. 18, 2018 (DE) ...................... 10 2018 211 929.5

(51) Int. Cl.
*H05B 47/18* (2020.01)
*B60Q 1/14* (2006.01)
*H05B 45/20* (2020.01)

(52) U.S. Cl.
CPC .............. *H05B 47/18* (2020.01); *B60Q 1/14* (2013.01); *B60Q 2400/20* (2013.01); *H05B 45/20* (2020.01)

(58) Field of Classification Search
None
See application file for complete search history.

(56) References Cited

U.S. PATENT DOCUMENTS 9,974,135 B1\* 5/2018 Nelson .................. G01J 1/4204
2008/0266842 A1\* 10/2008 Skidmore ................ E04B 9/32
362/147

(Continued)

FOREIGN PATENT DOCUMENTS

DE   10 2006 021 694 B4   10/2012
DE   10 2011 119 230 A1   5/2013

(Continued)

OTHER PUBLICATIONS

International Search Report (PCT/ISA/210) issued in PCT Application No. PCT/EP2019/067654 dated Oct. 14, 2019 with English translation (four (4) pages).

(Continued)

*Primary Examiner* — Crystal L Hammond
(74) *Attorney, Agent, or Firm* — Crowell & Moring LLP

(57) ABSTRACT

A lighting device comprises a plurality of light-emitting devices, which are connected to a communication bus in the motor vehicle and receive successive messages from an electronic control unit. The light-emitting devices of the plurality of light-emitting devices are divided into a plurality of groups. Each group is formed of one or more light-emitting devices. One group is associated with each message. Each message specifies one or more operating parameters for an individual light-emitting device. A light-emitting device that is in the associated group of a received message performs its operation based on the operating parameter(s). The electronic control unit changes the division of the plurality of light-emitting devices in groups at least once during the operation of the lighting device.

13 Claims, 2 Drawing Sheets

(56) References Cited

U.S. PATENT DOCUMENTS

2013/0127612 A1  5/2013  Stadler et al.
2014/0265934 A1  9/2014  Ramey

FOREIGN PATENT DOCUMENTS

DE  11 2014 003 826 T5   6/2016
DE  10 2015 118 302 A1   6/2017
DE  10 2016 207 724 A1  11/2017
WO  WO 2017/062691 A1   4/2017

OTHER PUBLICATIONS

German-language Written Opinion (PCT/ISA/237) issued in PCT Application No. PCT/EP2019/067654 dated Oct. 14, 2019 (six (6) pages).
German-language Office Action issued in German Application No. 10 2018 211 929.5 dated Dec. 21, 2018 (six (6) pages).

* cited by examiner

METHOD FOR OPERATING A LIGHTING DEVICE IN A MOTOR VEHICLE

BACKGROUND AND SUMMARY OF THE INVENTION

The present subject matter relates to a method for operating a lighting device in a motor vehicle and to a corresponding lighting device.

The prior art discloses lighting devices for motor vehicles which comprise a multiplicity of lighting units connected to a communication bus. In this case, messages which alter the operating parameters of the lighting units are passed to the bus via an electronic control unit of the lighting device. Such lighting devices are often installed in the interior of a motor vehicle in order to produce different light presentations via the lighting units.

In lighting devices of the above type, the messages are passed to the communication bus at a predefined rate. In this case, only operating parameters of an individual lighting unit can be defined by a message. Accordingly, it was conventional practice for a message to only alter the operating parameters of an individual lighting unit specified in the message. In this case, however, there is the problem that a desired simultaneous change of the operating parameters of a plurality of lighting units is associated with a time delay since corresponding messages are passed to the communication bus successively by the electronic control unit. Accordingly, under certain circumstances, the user perceives an undesired time delay during the switching of the lighting units.

In order to solve the problem above, it is known from the prior art to stipulate predefined groups of lighting units in the electronic control unit of the lighting device, wherein each message passed to the communication bus is allocated to a group and contains identical operating parameters for each lighting unit of the group. Time delays during the switching of lighting units can be avoided in this way. However, the stipulation of the predefined groups always prescribes which lighting units simultaneously change their appearance or behavior. This restricts the possibilities for producing dynamic light presentations.

Therefore, it is an object of the present subject matter to provide a method for operating a lighting device which enables the lighting units of the lighting device to be driven in a flexible manner.

The method according to the present subject matter serves for operating a lighting device in a motor vehicle. Depending on the configuration, the lighting device can involve interior lighting, such as, e.g., ambient interior lighting, or optionally exterior lighting on the exterior of the motor vehicle. The lighting device comprises a plurality of lighting units, which are connected to a communication bus in the motor vehicle and successively receive messages from an electronic control unit via the communication bus. The lighting units of the plurality of lighting units are divided into a plurality of groups, each composed of one or more lighting units, and each message is assigned a group. In this case, lighting units can optionally also be allocated to a plurality of different groups. The groups are preferably disjoint, however, such that each lighting unit is allocated to exactly one group.

Each message transmitted via the communication bus specifies one or more operating parameters (i.e. corresponding operating parameter values) for an individual lighting unit, and a respective lighting unit which is in the assigned group of a received message carries out its operation on the basis of the operating parameter(s) from the received message, i.e., the respective lighting unit uses at least one portion of the operating parameters from the message for its operation. All lighting units that do not belong to the group of the received message ignore the operating parameters in the message and continue operation based on the operating parameters currently set.

The method according to the present subject matter is distinguished by the fact that the electronic control unit alters the division of the plurality of lighting units into groups at least once during the operation of the lighting device. In this way, the light distribution generated by the lighting device can be adapted in a very flexible manner by group associations of corresponding lighting units being altered. The possibilities for producing different light presentations are significantly extended as a result.

In one preferred embodiment, the plurality of lighting units comprises one or more LED units, each comprised of one or more LEDs. Preferably, all the lighting units of the plurality of lighting units are LED units. Particularly preferably, the LED units are so-called RGB LED units, which comprise a red, a green and a blue LED and which can generate different colors via corresponding driving of these LEDs. Nevertheless, the lighting units can also comprise different types of lighting units as LED units. For example, at least one portion of the lighting units can also comprise laser light units, each composed of one or more laser diodes.

In a further preferred configuration of the method according to the present subject matter, a group which is modified by the alteration of the division of the plurality of lighting units into groups replaces the group valid attribute before the modification, which is achieved by the group valid attribute before the modification being erased by the electronic control unit. The storage space to be kept available on the electronic control unit for defining the groups is utilized efficiency in this way.

In a further preferred configuration of the method according to the present subject matter, the messages are transmitted by the electronic control unit in such a way that messages to which a group containing the respective lighting unit is assigned are received by each lighting unit at time intervals below a threshold value predefined for the respective lighting unit. This takes account of the fact that lighting units often require a signal at predefined minimum time intervals since otherwise they turn themselves off. Accordingly, messages sent to lighting units also optionally include ones which do not bring about an alteration of the current operating parameters, but are required in order that the corresponding lighting unit does not turn itself off.

In a further preferred configuration, the electronic control unit of the lighting device according to the present subject matter controls the transmission of the messages in such a way that messages which bring about the alteration of at least one operating parameter of at least one lighting unit are prioritized vis-à-vis such messages which do not lead to an alteration of operating parameters of the lighting units. This ensures that changeovers during the operation of the lighting units become visible quickly.

Depending on the configuration, the number of operating parameters can contain different variables. Preferably, the number of operating parameters comprises a target brightness with which a lighting unit is intended to emit light. The lighting units can thus vary their brightness. Preferably, the number of operating parameters also contains a time period which defines the duration of the change to the target brightness.

In a further variant of the method according to the present subject matter, the number of operating parameters comprises a target color in which a lighting unit is intended to emit light, wherein the number of operating parameters preferably also contains a time period which defines the duration of the change to the target color. The above terms of target brightness and target color and time period should be understood broadly. These variables can be represented in the corresponding message not directly by corresponding brightness and color and time values, respectively, but rather by variables (such as, e.g., indices) which are assigned to such values. If, in the embodiments above, the lighting unit addressed by the message has already been set to the target brightness or respectively the target color of the received message, the corresponding time durations of the change in brightness or color are not considered in the lighting unit.

The communication bus for transmitting the messages that is used in the method according to the present subject matter can be based on various technologies. In one example embodiment, a LIN (Local Interconnect Network) bus is involved.

Besides the method described above, the present subject matter relates to a lighting device for a motor vehicle, said lighting device comprising a plurality of lighting units, which are connected to a communication bus, which is installed in the motor vehicle during operation of the lighting device. The lighting device comprises an electronic control unit, which successively transmits messages during the operation of the lighting device, said messages being received by the lighting units of the plurality of lighting units via the communication bus. During the operation of the lighting device, the lighting units of the plurality of lighting units are divided into a plurality of groups, each composed of one or more lighting units and each message is assigned a group. In this case, each message specifies one or more operating parameters and a lighting unit which is in the assigned group of a received message carries out its operation based on the operating parameter(s) from the received message. The lighting device according to the present subject matter is distinguished by the fact that the electronic control unit alters the division of the plurality of lighting units into groups at least once during the operation of the lighting device.

In one preferred configuration, the lighting device according to the present subject matter is configured for carrying out one or more preferred variants of the method according to the present subject matter.

The present subject matter furthermore relates to a motor vehicle comprising one or more lighting devices according to the present subject matter or according to one or more preferred embodiments of the present subject matter.

Example embodiments of the present subject matter are described in detail below with reference to the accompanying figures.

DETAILED DESCRIPTION OF THE DRAWINGS

A description is given below of one embodiment of the present subject matter based on a lighting device in a motor vehicle, said lighting device comprising a multiplicity of LED units as lighting units. The lighting device preferably involves ambient interior lighting. The LED units are designated by LE1, LE2, LE26 in the schematic illustration in FIG. 1. In other words, the lighting device contains 26 LED units. These LED units are connected to an electronic control unit 1 via a communication bus 2 in the form of a LIN bus. The LIN bus is limited to operating no more than 26 lighting units in the lighting device. In the embodiment described here, the LED units are RGB LED units, which contain a red, a green, and a blue LED, and can generate different colors via corresponding color mixing of these LEDs. Furthermore, the brightness of the LEDs and thus the total brightness of the RGB LED units can be varied.

The LED units LE1 to LE26 are driven by way of messages ME (see FIG. 2) which are generated at regular time intervals (e.g. 10 ms), i.e. with a predefined update rate, in the electronic control unit 1 and are passed to the LIN bus 2, such that all the LED units receive the messages. In the embodiment described here, the LED units are divided into disjoint groups, i.e. each LED unit is uniquely assigned to a group composed of one or more LED units. In this case, the division into groups is performed by the electronic control unit. In this case, each transmitted message ME is assigned to a group and enables all the LED units of the group to be driven simultaneously, with the stipulation that the corresponding operating parameters of the respective LED units of the group are changed in the same way. Those LED units which are not in the group of the respective received message ignore the content of the message.

Figure 1:
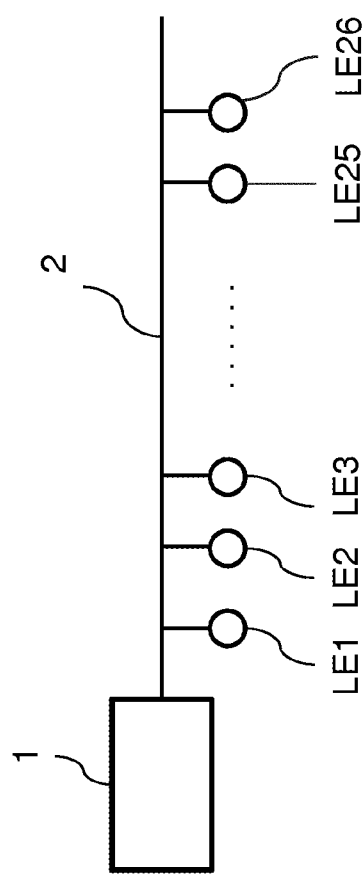
FIG. 1 shows a schematic illustration of one embodiment of a lighting device according to the present subject matter.
Figure 2:
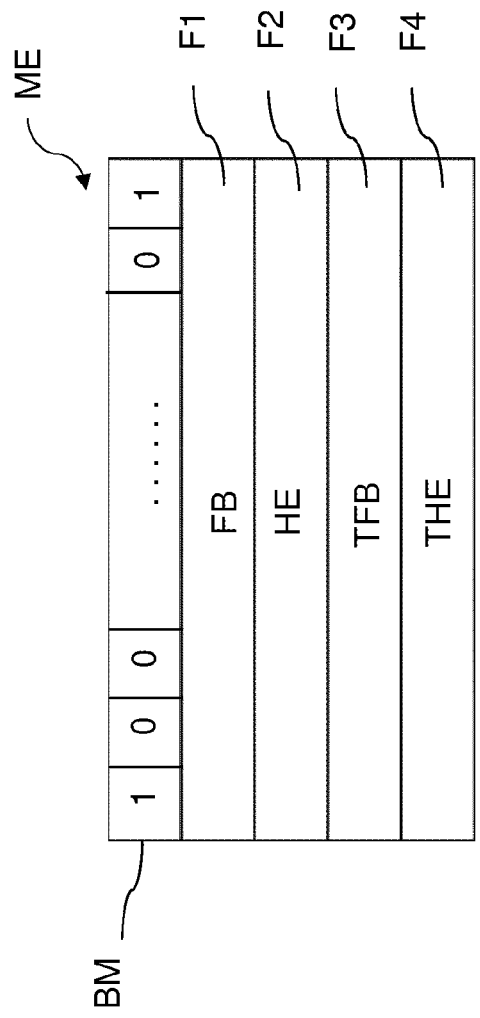
FIG. 2 shows a schematic illustration of a message which is passed to the communication bus by the electronic control unit in the lighting device from FIG. 1.

FIG. 2 schematically shows the format of the messages ME used in the lighting device from FIG. 1. The message ME illustrated comprises a bit mask BM, in which each of the 26 LED units is assigned a bit. The bit mask defines the association of the LED units with the corresponding group which is assigned to the message ME. A bit having the value "1" indicates in the order of the numbering of the LED units that the corresponding LED unit belongs to the group which is intended to be addressed by the message ME. In the message ME illustrated by way of example in FIG. 2, inter alia the LED unit LE1 and the LED unit LE26 thus belong to the corresponding group.

The message ME contains the further fields F1 to F4. In this case, the field F1 indicates a color value FB to which a respective LED unit of the group is intended to be set when the message ME is received. By contrast, the field F2 specifies a brightness value HE to which a respective LED unit of the group is intended to be set. The field F3 defines the duration TFB of the change to the target color FB for a respective LED unit of the group. If the LED unit has already been set to the target color, this parameter is not processed further since the LED unit need not carry out a change in color. The field F4 specifies the duration THE of the change to the target brightness HE for a respective LED unit of the group. If the LED unit already has the target brightness, this value is not taken into account by the LED unit since the target brightness has already been set.

Conventionally, in the electronic control unit 1 the division of the LED units into groups is predefined statically and cannot be altered during the operation of the lighting device. Accordingly, the possibilities of dynamic changes in color are limited since only ever fixedly predefined groups of LED units can alter their operating parameters via corresponding messages.

Figure 3:
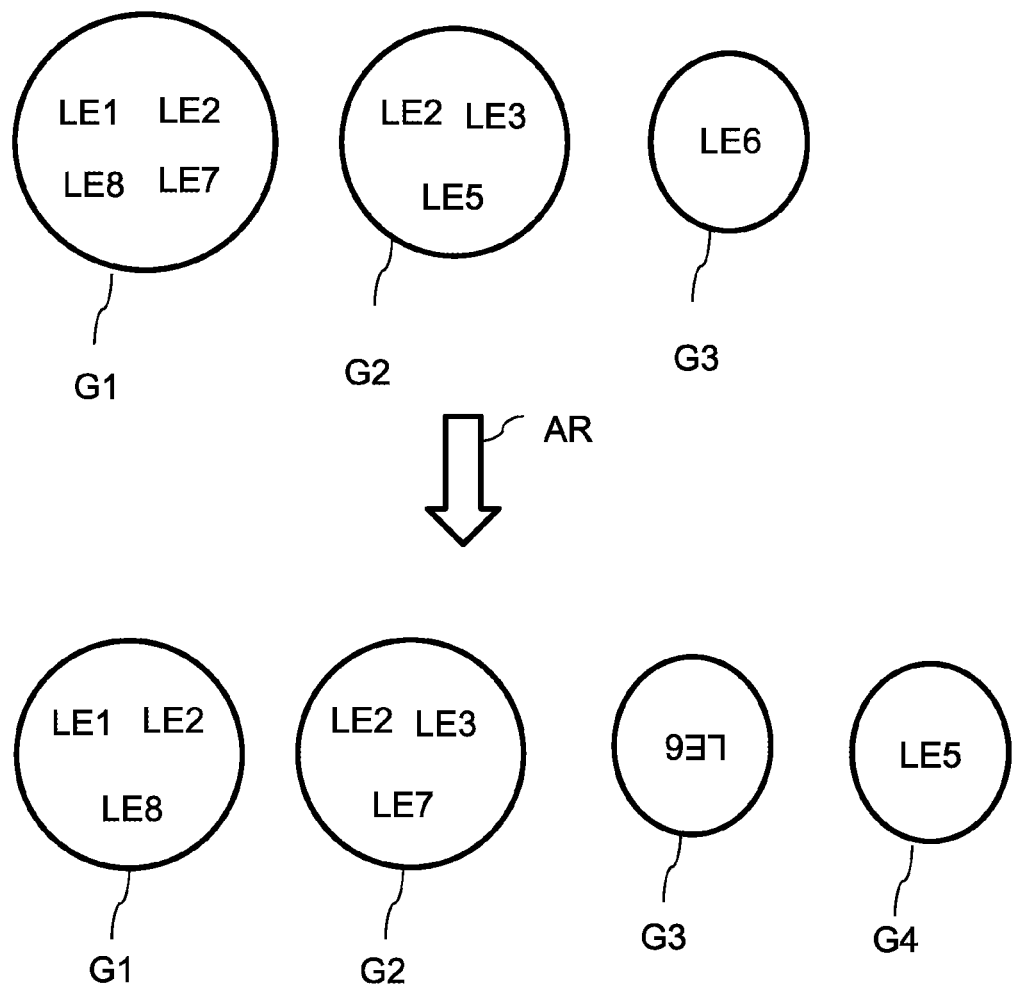
FIG. 3 shows a schematic illustration that elucidates by way of example the alteration according to the present subject matter of the division of lighting units into groups.

In order to extend the possibilities of different light presentations, the present subject matter proposes altering the grouping of the LED units dynamically during the operation of the lighting device via the electronic control unit 1. By way of example, FIG. 3 indicates such a dynamic grouping for the lighting device from FIG. 1. For reasons of clarity, the grouping is indicated here only for a portion of the LED units, namely for the LED units LE1 to LE8. Firstly, the electronic control unit 1 defines the grouping in such a way that the LED units LE1, LE2, LE7 and LE8 form a group G1, the LED units LE2, LE3 and LE5 form a group G2 and the single LED unit LE6 forms a group G3. The respective LED units of a group are always addressed by messages associated with the group and can thus only jointly change their operating parameters. The association of the LED units with a group is specified by way of the bit pattern BM of the message. This message is not relevant to all LED units which are not in the group of the corresponding message in accordance with the bit pattern BM. The message is therefore not processed further in these LED units.

At a specific point in time it is desirable for the LED units to be grouped differently, i.e. the intention is to drive other combinations of LED units with the same operating parameters. In this case, an algorithm is stored in the electronic control unit 1, which algorithm dynamically adapts the corresponding grouping of the lighting units depending on specific events, such as e.g. an operating action performed by the driver for changing a light scenario. By way of example, a regrouping of LED units is indicated by the arrow AR in FIG. 3. In the electronic control unit 1, a change of the division of the groups is achieved in this case by alteration of the bit patterns BM of the corresponding messages. In the scenario in FIG. 3, the group G1 now only contains the LED units LE1, LE2 and LE8. The LED unit LE7 has moved into the group G2, which now contains the three LED units LE2, LE3 and LE7. By contrast, the LED unit LE5 originally contained in the group G2 is intended to be driven separately from the other LED units, and so a new group G4 having the single LED unit LE5 is formed. The regrouping has no influence on the LED unit LE6, i.e. the LED unit LE6 still remains in the group G3.

In accordance with the embodiment just described, there is no longer static stipulation of which LED units are in which group. Consequently, there is no longer a predefinition of which LED units are intended to have an identical appearance or are intended to behave identically at any time. Instead, appearance and behavior in a specific situation can be defined individually for each LED unit. An algorithm in the electronic control unit groups all the LED units dynamically into groups to which the same properties are assigned in accordance with corresponding operating parameters in the messages. If e.g. the color value of an LED unit is intended to change, the algorithm decides whether this LED unit can remain in its existing group or can be assigned to an already existing group having an identical appearance or whether a new group is created, in which this LED unit is sorted. If the LED unit is assigned to a new group, it is simultaneously removed from the previous group.

The LED units used in the embodiment just described generally require a signal after a specific maximum time (e.g. 4 seconds) has elapsed, since otherwise they turn themselves off. Accordingly, the driving of the LED units LE1 to LE26 by the electronic control unit 1 is configured in such a way that, before said maximum time has elapsed, a respective LED unit receives a message, even if the message contains operating parameters which are identical to the current operating parameters of the corresponding LED unit. In order furthermore to ensure that changes to operating parameters of an LED unit become visible as quickly as possible, a prioritization of messages is performed by the electronic control unit 1. In this case, messages for such groups which contain LED units whose operating parameters are altered by the corresponding message are prioritized. In other words, such messages have a higher priority than messages which leave operating parameters of the LED units of the corresponding group unaltered, but are required in order to prevent the LED units from being turned off upon the above maximum time being exceeded.

The embodiments of the present subject matter described above have a number of advantages. In particular, by varying the division of lighting units into groups, it is possible to generate dynamic or flowing light, which is perceived as pleasant. The dynamic grouping of lighting units additionally enables more flexibility in the definition of light presentations since optionally different lighting units can participate in each light presentation and it is not necessary always for the same subsets of lighting units to have an identical appearance or behavior. Suitable grouping of the lighting units furthermore makes it possible to ensure that when a light scenario is changed manually by a user, no delay perceptible to the user occurs between the manual change and the actual changeover of the lighting units.

LIST OF REFERENCE SIGNS

1 Electronic control unit
2 LIN bus
LE1, LE2, LE26 Lighting units
ME Message
BM Bit mask
FB, HE, TFB, THE Operating parameters
F1, F2, F3, F4 Fields
G1, G2, G3, G4 Groups
AR Arrow

What is claimed is:

1. A method for operating a lighting device in a motor vehicle, comprising:
    altering, by an electronic control unit, a division of a plurality of light-emitting devices into a plurality of groups at least once during the operation of the lighting device;
    transmitting, by the electronic control unit, successive messages to the plurality of light-emitting devices via a communication bus in the motor vehicle; and
    carrying out, by a respective light-emitting device of a respective group, an operation based on one or more operating parameters specified in a received message of the successive messages that is received by the respective group, wherein
        the lighting device comprises the plurality of light-emitting devices that are connected to the communication bus in the motor vehicle;
        the light-emitting devices of the plurality of light-emitting devices are divided into the plurality of groups that each comprise one or more light-emitting devices; and
        each message of the successive messages is assigned to a group of the plurality of groups.

2. The method according to claim 1, wherein
    the plurality of light-emitting devices comprises one or more light-emitting diodes (LEDs); and
    one or more LEDs are of an RGB type, comprising a red, a green, and a blue LED.

3. The method according to claim 1, wherein the step of altering further comprises:
    erasing a group valid attribute of a group before the altering; and after erasing the group valid attribute of the group, altering the division of the plurality of light-emitting devices into the plurality of groups.

4. The method according to claim 1, wherein the successive messages are transmitted by the electronic control unit such that messages to which a group containing the respective light-emitting device is assigned are received by each light-emitting device in the group at time intervals below a threshold value.

5. The method according to claim 1, wherein the electronic control unit controls the transmission of the messages such that messages that cause a modification of at least one operating parameter of at least one light-emitting device are prioritized when compared with such messages that do not cause a modification of at least one operating parameters of the light-emitting devices.

6. The method according to claim 1, wherein the one or more operating parameters comprises a target brightness with which a light-emitting device is specified to emit light; and the one or more operating parameters comprises a time period that defines a duration of a change to the target brightness.

7. The method according to claim 1, wherein the one or more operating parameters comprises a target color in which a light-emitting device is specified to emit light; and the one or more operating parameters comprises a time period that defines a duration of the change to the target color.

8. The method according to claim 1, wherein the communication bus is a LIN bus.

9. The method according to claim 1, wherein the lighting device provides interior lighting in the motor vehicle or provides exterior lighting on the exterior of the motor vehicle.

10. The method according to claim 1, wherein each light-emitting device belongs to only one group.

11. A lighting device for a motor vehicle, comprising:

a plurality of light-emitting devices connected to a communication bus, which is installed in the motor vehicle during operation of the lighting device; and an electronic control unit to:
  successively transmit messages during the operation of the lighting device to the light-emitting devices of the plurality of light-emitting devices via the communication bus; and
  alter a division of the plurality of light-emitting devices into groups at least once during the operation of the lighting device, wherein
    during the operation of the lighting device, the light-emitting devices of the plurality of light-emitting devices are divided into a plurality of groups, each comprising one or more light-emitting devices;
    each message is assigned to a group and specifies one or more operating parameters for an individual light-emitting device; and
    a respective light-emitting device that is in the assigned group of a received message carries out its operation based on the one or more operating parameter(s) specified in the received message.

12. The lighting device according to claim 11, wherein the lighting device is configured for carrying out a method according to claim 1.

13. A motor vehicle, comprising:
one or more lighting devices of claim 11.

* * * * *